United States Patent [19]
Gilbert et al.

[11] Patent Number: 5,862,224
[45] Date of Patent: Jan. 19, 1999

[54] CRYPTOGRAPHIC PROCESS FOR PROTECTION AGAINST FRAUD

[75] Inventors: Henri Gilbert, Bures sur Yvette; David Arditti, Clamart, both of France

[73] Assignee: France Telecom, Paris, France

[21] Appl. No.: 731,488

[22] Filed: Oct. 16, 1996

[30] Foreign Application Priority Data

Oct. 17, 1995 [FR] France ................................. 95 12144

[51] Int. Cl.⁶ .............................. H04K 9/04; H04L 9/00
[52] U.S. Cl. ................... 380/28; 380/23; 380/25; 380/30
[58] Field of Search ................. 380/28, 23, 24, 380/25, 49, 30

[56] References Cited

U.S. PATENT DOCUMENTS 4,926,478  5/1990  Gruenberg ................... 380/21
5,640,455  6/1997  Shimada ....................... 380/42
5,666,419  9/1997  Yamamoto et al. ........... 380/28

FOREIGN PATENT DOCUMENTS 0 294 248  12/1988  European Pat. Off. .
0 409 701   1/1991  European Pat. Off. .
2 471 003   6/1981  France .
2 698 195   5/1994  France .

*Primary Examiner*—Bernarr E. Gregory
*Assistant Examiner*—Carmen D. White
*Attorney, Agent, or Firm*—Oblon, Spivak, McClelland, Maier & Neustadt, P.C.

[57] ABSTRACT

A cryptographic process is for protection against fraud. An allocation of a secret key K is made to a card and to an application and an input value R is defined. The card and application calculate the modulo 2 scalar product of binary vectors constituted by words of R and words of K. The application checks whether the result obtained by the card is in agreement with its own result. An exemplary application is low cost cards.

6 Claims, No Drawings

CRYPTOGRAPHIC PROCESS FOR PROTECTION AGAINST FRAUD

DESCRIPTION

1. Technical Field

The present invention relates to a cryptographic process for protecting against fraud. The process of the invention is mainly intended for the logic protection of integrated circuit, wired logic or microprocessor cards, particularly prepaid cards used for various transactions, such as telecards, cards used in automatic distributors, in parking meters, for paying public transport services, road tolls, etc. This process is particularly appropriate for the constraints imposed by so-called synchronous, wire logic cards, which are very low cost cards.

The process of the invention makes it possible to prevent frauds such as the recopying or imitation of a card or the fraudulent use of a genuine card (by altering instructions entered in the card or data read in the card) and this is obtained at a lower cost and with a more quantifiable security than by the presently used, logic protection processes.

2. Prior Art

For certain microprocessor-equipped smart cards, the use of authentication or message authentication algorithms, also known as MAC enables the security module (or more generally the application which the card accesses) to ensure the identity of a card and, if the latter has a charging unit counting function, debits the same in a reliable manner. The security protocols used are based on the sharing between the card and the application of a secret key, which can e.g. be deduced from a master key applicable to the entire application by means of a diversification calculation relative to the card serial number. The secret key is placed in the card during personalization and is involved in the authentication or message authentication algorithms which can be of a very varied nature, but which generally involve random variables so as to prevent any fraud by replay.

Reference is made hereinafter to three simple examples of such protocols.

Protocol A: despatch, by application of a random number to the card and then reading by the application of the result of the authentication calculation performed on this number by the card. The comparison between the result read in the card and the result of the authentication calculation performed by the application constitutes a verification of the identity of the card.

Protocol B: despatch, by the application of a decrementation order of an internal counter to the card and containing as a parameter a random number emitted by the application, then reading by the application of the result of an authentication calculation performed on said number by the card. The comparison between the result read in the card and the result of the authentication calculation performed by the application constitutes a verification of whether the decrementation has been performed by the card.

Protocol C: despatch, by the application of a random number and a certified reading order of a data item contained in the card, followed by reading by the application of the result of a message authentication calculation (MAC) performed by the card on the basis of the random number of the data item to be certified. The comparison between the result read in the card and the result of the message authentication calculation performed by the application enables the latter to check the authenticity of the data item.

These authentication or message authentication algorithms used in microprocessor cards are relatively complex (generally a few hundred code bytes for an 8 bit microprocessor). It is not possible to use such algorithms in lower cost cards, such as e.g. synchronous cards.

Consequently, most wired logic cards (such as e.g. telecards) use no logic protection process. The only protection against fraud is the equipment difficulty in manufacturing a false card reproducing the behaviour of a genuine card, said difficulty being greater in the case of magnetic strip cards.

However, in certain recent synchronous cards, authentication and message authentication algorithms of a specific nature and implementable by synchronous cards and having a very different structure from that of the algorithms generally used on microprocessors have been designed. Such algorithms are described in FR-A-2 650 097.

The main disadvantage of the known procedure used in microprocessor cards is its complexity, which prevents its use in very low cost cards and which, even in the case of microprocessor-equipped cards, is sometimes prejudicial.

The method used in wired logic cards suffers from disadvantages. As for secret key algorithms of microprocessor cards, there is no security proof for algorithms of this type. Moreover, the very considerable constraints imposed by the reduced capacities of synchronous cards prevent the retaining within their design of a safety margin which is as wide as in microprocessor card algorithms. Therefore under such conditions the algorithm used is kept secret, which can create difficulties in the commercialization of the card in which it is used. The logic protection means of such cards represents a non-negligible fraction of their silicon surface and therefore their cost.

DESCRIPTION OF THE INVENTION

The object of the invention is to obviate the disadvantages of the aforementioned authentication or message authentication processes, by taking advantage of the fact that in numerous applications, there is only a small number of uses between two reloadings (case of reloadable cards) or during the life of a card (case of non-reloadable cards).

The invention is based on the idea that if such a limitation is accepted with respect to the number of uses (about one hundred transactions) and if use is made for the protection of the card of longer keys than those used in the aforementioned authentication or message authentication algorithms, it becomes possible to use the key for the authentication or acknowledgement of an instruction, or even for certifying data contained in the card, in accordance with a process having the following advantages:

provable and quantifiable security: the security of the process against a defrauder wishing to exploit the collected data by observing exchanges in order to pass with success a new control or clone a card is independent of the calculating power and cryptoanalytical knowledge of the defrauder, which is not the case with the aforementioned authentication or message authentication processes;

the calculations are much simpler than in the aforementioned authentication or message authentication processes and better adapted to the constraints of synchronous cards, which for certain circuit technologies leads to greater economies due to the increase in the size of the key.

The calculations required by the process according to the invention are essentially modulo 2 scalar products between words of n bits. Such a product is defined in the following way: if $X=(x_0, \ldots, x_{n-1})$ and $Y=(y_0, \ldots, y_{n-1})$ are two words of n bits, each of which can assume the value 0 or 1, the scalar product of X by Y, designated X.Y, is equal to $$\left( \sum_{i=0}^{n-1} x_i . y_i \right)$$

mod 2.

In other words, the product is formed of the bits of the same rank of two words and the modulo 2 sum of the n products obtained is formed.

Such calculations can be very easily performed by synchronous cards, because they are implementable by means of n iterations of the very simple elementary calculation consisting of calculating (by a logic AND between two bits) a term of form $x_i.y_i$, and then accumulating it (by an XOR) with the current value in a flip-flop or a memory bit.

The process of the invention is based on a cryptographic calculation performed both in the cards and in the application checking said cards, said calculation supplying, as a function of an input word R (e.g. a random number resulting from the application) and a secret key K, an answer word S. Thus, r is the number of words of n bits constituting the input word R and k is the number of words of n bits constituting the secret key K. A word of R, designated $R_i$ (i being an integer from 0 to r−1) is combined with k words of K, designated $K_j$ (in which j is an integer from 0 to k−1), in order to obtain k scalar products $R_i K_j$ (i fixed, j from 0 to k−1). Each of the k scalar products gives a bit equal to 0 or 1. As there are r words $R_i$ (i from 0 to r−1), this series of scalar products is obtained k times, i.e. in all kr bits. Thus, the answer word S is a word of kr bits. Each bit of this word can be designated $s(i,j)=R_i K_j$ (i from 0 to r−1 and j from 0 to k−1).

The parameters, n, k and r can be chosen so as to obtain varied compromises between the sizes of R, K and S and the maximum number of interrogations permitted for the same key K.

More specifically, the present invention relates to a cryptographic process for protecting against fraud in transactions involving a first means, called a card, held by a user and a second means, called an application, said process being characterized in that it comprises the following operations:

allocation takes place to the card and to the application of a first word K, called secret key, said first word being constituted by a number k of words, each of which has a number n of bits, a second word R, called input word, is defined, said second word being constituted by a number r of words, each having a number n of bits, the card and application in each case calculate the modulo 2 scalar product of each of the r words of the input word R with each of the k words of the secret key K, said calculation supplying a third word S, called the result, said third word having a number k.r of bits, the card addresses the result S which it has obtained to the application and the application checks whether this result is identical to the result which it obtained.

In a first embodiment, it is the application which produces the input word R and which addresses it to the card.

In a second embodiment, the application supplies a random variable to the card and the input word R is obtained by combination between said random variable and a data item read in the card.

The calculation of the result word S can take place sequentially on taking each word of the input word R at the time when it is available and by multiplying it by all the k words of the secret key K. However, this calculation can also take place in parallel, on receiving the r words constituting the input word R and calculating in parallel the scalar product of each of these r words with the k words of the secret key K.

DETAILED DESCRIPTION OF EMBODIMENTS

The security of the cryptographic calculation proposed by the invention is based on the following property. For a number of calculations c below n/r, the probability (on the cth input R) that a defrauder knowing the preceding c−1 input and output pairs (R,S) will be able to predict a random information on the output S corresponding to the cth input R (i.e. e.g. knows how to predict one of the bits of S with a probability greater than ½) is equal to or below $r/2^{n-cr+1}$.

The proof of this property can be supplied in the following way. The only unfavourable cases are those for which there is an index i between 0 and r−1, such that the component $R_i$ of the cth input R is a modulo 2 linear combination of the components $R_j$ (j=0, ... r−1) of the c−1 inputs R used for the c−1 first calculations and r−1 other components $R_j$ (j=0, ..., r−1, j≠i) of the cth input. However, for each index i, the probability of such an event is below $\frac{1}{2}^{n-rc+1}$, hence the indicated increase for the probability of unfavourable cases. Moreover, in the favourable cases, the $2^{rk}$ answers S at the cth input R which are a priori possible, are strictly equiprobable for a defrauder knowing the c−1 first pairs (R,S), because the keys K compatible with the c−1 first pairs and leading to a cth answer S of a given nature constitute a subspace of the space of the keys with a dimension independent of the value of S.

A numerical example can be given for explanatory purposes. If r=2, k8 and n=128, following 49 calculations, the answer S of length 16 bits to a 50th question R of length 256 bits of totally unpredictable, except for a proportion of at the most $$\frac{2}{128 - 100 + 1} \left( \text{i.e. approximately } \frac{1}{268.10^6} \right)$$

of the possible values of the 50th question. In this example, the length of the key K is 1024 bits.

The cryptographic calculations of the invention can be used in various protocols able to carry out, as a function of the particular case, a pure authentication, the verification by an application of the good performance by a card of an instruction such as the decrementation of a charging counter, or even the certified reading in a card of data such as the value of a charging counter. These protocols differ as a function of the nature of the input R (which can be, as a function of the case, a data item supplied by the application, a data item internal to the card, or a mixture of both) and external conditions (instructions resulting from the performance of calculations) and internal conditions (relating to the state of the card) leading to the performance of calculations.

In all cases, it is essential that the same key can only be used in the card a limited number of times, depending of the value of the parameters n and r and the safety margins which it is wished to respect. A natural means for bringing about such a limitation is to introduce into the card a counter evolving systematically on each performance of calculations and only authorizing in the card the performance of a new calculation if a condition relating to the value of said counter is satisfied. Various known methods exist for producing such a counting action in a card.

In the form of non-limitative embodiments of the invention a description will now be given of three card-application security protocols (protocols 1, 2 and 3) based on the process of the invention and intended to offer a security service comparable to that offered respectively by the aforementioned protocols for more complex cards. However, the preceding calculating process is only one of the elements of the calculations to be performed for protocol 3 and the process used for performing the rest of the calculations for protocol 3 is not explained.

PROTOCOL 1

Pure Authentication

A pure authentication can be used for checking the identity of a card or for checking a right (e.g. the right to have access to a service), ensuring that a card has an authentication key linked with said right).

During the personalization or reloading of a card, a secret key K is deposited in the card and an internal counter CPT of the number of authorized individual calculations is set at a value CPTMAX. Whenever the application has to carry out an authentication of a card (whereof it has previously read the number and refound the secret key K, e.g. by means of a diversification calculation), it supplies to the card a random number R. If the value of the counter CPT is equal to or greater than 1, the card decrements the CPT value by one unit and performs the calculation of S, in the case of a synchronous card as the bits of R are entered in the card. The application can then read the answer S of the card and check it.

PROTOCOL 2

Verification of the Satisfactory Performance of an Instruction, Such as the Decrementation of a Counter The protocol example proposed here greatly resembles the preceding protocol. The essential difference is that the internal counter CPT does not only represent the number of residual calculations authorized in the card, but also the remaining "credit" of the card, e.g. with regards to charging units.

In order to decrement the credit of the card by one unit, the application sends it a decrementation instruction accompanied by a random number R. If the remaining credit is positive, the card decrements the credit counter CPT by one unit and then performs a cryptographic calculation on the basis of the input R and its key K. The application can then read the answer S obtained and thus check that the decrementation instruction has been correctly performed.

PROTOCOL 3

Certification of a Data Item Within a Card

It is wished to check the authenticity of the value of a data item D read by the application in a card. This data item can e.g. represent the remaining credit of a card expressed in monetary units, etc.

A counter CPT of the number of authorized residual calculations and separate from the data item D to be signed and initialized to a value CPTMAX during the installation of the key is once again used here. On receiving a reading instruction certified by the card and provided that the value of the counter CPT is strictly positive, a performed message authentication algorithm, in which the aforementioned scalar product formation cryptographic calculation intervenes one or more times with inputs R dependent on a random variable A supplied by the application and the data item D read in the card. As hereinbefore, the instruction brings about a decrementation of the counter CPT. The result of the algorithm is a message authentication word (MAC) usable by the application for checking the authenticity of the data item D.

We claim:

1. Cryptographic process for protecting against fraud in transactions involving a card, held by a user and an application, said process comprising the steps of:

allocating to the card and to the application a secret key K having k words, each one of said k words having n bits, creating an input R, to the card and to the application, said input R having r words, each one of said r words having n bits, calculating, by the card, a result $S_1$ which is a first modulo 2 scalar product of each one of the r words of the input R with each one of the k words of the secret key K, said result $S_1$ having k·r bits, calculating, by the application, a result $S_2$ which is a second modulo 2 scalar product of each one of the r words of the input R with each one of the k words of the secret key K, said result $S_2$ having k·r bits, transmitting, by the card, the result $S_1$ to the application, and verifying, by the application, that the result $S_1$ is equal to the result $S_2$.

2. Process according to claim 1, wherein said step of creating said input R further comprises the steps of:

creating, by the application, said input R, and transmitting, by the application, said input R to said card.

3. Process according to claim 1, wherein said step of creating said input R further comprises the step of:

creating said input R by using a random variable from said application and a data item from said card.

4. Process according to claim 1, wherein:

said step of calculating said result $S_1$ occurs sequentially taking each one of the r words of the input R at a time when said each one of the r words is available and calculating said first modulo 2 scalar product of said each one of the r words with all said k words of the secret key K, and said step of calculating said result $S_2$ occurs sequentially taking each one of the r words of the input R at a time when said each one of the r words is available and calculating said second modulo 2 scalar product of said each one of the r words with all said k words of the secret key K.

5. Process according to claim 1, wherein:

said step of calculating said result $S_1$ occurs in parallel, after creating said r words of the input R, by calculating in parallel said first modulo 2 scalar product of each one of said r words of said input R with said k words of said secret key K, and said step of calculating said result $S_2$ occurs in parallel, after creating said r words of the input R, by calculating in parallel said second modulo 2 scalar product of each one of said r words of said input R with said k words of said secret key K.

6. Process according to claim 1, wherein said step of calculating said result $S_1$ further comprises the step of:

determining, by the cards, a number of times that said result $S_1$ has been calculated, and calculating said result $S_1$ when it is determined that said number of times is below a predetermined limit number.

* * * * *